(12) United States Patent
Bahr

(10) Patent No.: US 10,148,781 B2
(45) Date of Patent: Dec. 4, 2018

(54) METHODS AND DEVICES FOR HANDLING AN EXTENDED PROXY INFORMATION ITEM

(75) Inventor: Michael Bahr, München (DE)

(73) Assignee: Siemens Aktiengesellschaft, Munich (DE)

( * ) Notice: Subject to any disclaimer, the term of this patent is extended or adjusted under 35 U.S.C. 154(b) by 951 days.

(21) Appl. No.: 14/117,257

(22) PCT Filed: May 11, 2012

(86) PCT No.: PCT/EP2012/058809

§ 371 (c)(1),
(2), (4) Date: Dec. 17, 2013

(87) PCT Pub. No.: WO2012/152931

PCT Pub. Date: Nov. 15, 2012

(65) Prior Publication Data

US 2015/0134775 A1    May 14, 2015

(30) Foreign Application Priority Data

May 12, 2011  (EP) .................................... 11003947

(51) Int. Cl.
*G06F 15/16*    (2006.01)
*H04L 29/08*    (2006.01)
(Continued)

(52) U.S. Cl.
CPC ...... *H04L 67/2804* (2013.01); *H04L 61/6022* (2013.01); *H04W 40/30* (2013.01); *H04W 84/18* (2013.01); *H04L 45/04* (2013.01)

(58) Field of Classification Search
CPC .......... H04L 67/2804; H04L 61/6022; H04W 40/30; H04W 84/18
(Continued)

(56) References Cited

U.S. PATENT DOCUMENTS 7,159,035 B2    1/2007  Garcia-Luna-Aceves et al.
8,316,153 B2    11/2012 Feng et al.
(Continued)

FOREIGN PATENT DOCUMENTS

CN        101534238       9/2009
JP        2002-534842     10/2002
(Continued)

OTHER PUBLICATIONS

Kraemer, Bruce, Draft Standards for Information Technology—Telecommunications and information exchange between systems—Local and metropolitan area networks—Specific requirements Part 11: Wireless LAN Medium Access Control (MAC) and Physical Layer (PHY) specifications Amendment 10: Mesh Networking, Apr. 1, 2011, IEEE 802.11s/D11.0.*

(Continued)

*Primary Examiner* — Vivek Srivastava
*Assistant Examiner* — Atta Khan
(74) *Attorney, Agent, or Firm* — Cozen O'Connor

(57) ABSTRACT

Methods and devices for handling an extended proxy information item, wherein a proxy information sequence number associated to the extended proxy information item is used to avoid misinterpretations of outdated messages with proxy information items.

8 Claims, 4 Drawing Sheets

(51) Int. Cl.
*H04W 40/30* (2009.01)
*H04W 84/18* (2009.01)
*H04L 29/12* (2006.01)
*H04L 12/715* (2013.01)

(58) Field of Classification Search
USPC .......................................................... 709/217
See application file for complete search history.

(56) References Cited

U.S. PATENT DOCUMENTS

| | | | |
|---|---|---|---|
| 8,730,958 B2* | 5/2014 | Feng | H04W 40/248 370/242 |
| 2002/0013856 A1 | 1/2002 | Garcia-Luna-Aceves et al. | |
| 2002/0049561 A1* | 4/2002 | Garcia-Luna-Aceves | H04L 45/02 702/182 |
| 2003/0028668 A1 | 2/2003 | Garcia-Luna-Aceves et al. | |
| 2003/0037167 A1 | 2/2003 | Garcia-Luna-Aceves et al. | |
| 2007/0076730 A1 | 4/2007 | Rahman et al. | |
| 2008/0186907 A1* | 8/2008 | Yagyuu | H04B 7/155 370/328 |
| 2008/0186984 A1* | 8/2008 | Nakano | H04L 45/22 370/400 |
| 2008/0301308 A1* | 12/2008 | Li | H04L 65/608 709/228 |
| 2009/0100465 A1 | 4/2009 | Kulakowski | |
| 2009/0175208 A1 | 7/2009 | Thubert et al. | |
| 2010/0135262 A1* | 6/2010 | Park | H04L 45/021 370/337 |
| 2010/0217847 A1 | 8/2010 | Cook et al. | |
| 2011/0016227 A1 | 1/2011 | Feng et al. | |
| 2013/0039280 A1* | 2/2013 | Feng | H04W 40/248 370/328 |

FOREIGN PATENT DOCUMENTS

| | | |
|---|---|---|
| JP | 2008-193543 | 8/2008 |
| JP | 2010-509877 | 3/2010 |
| WO | WO 2006/059643 | 6/2006 |
| WO | WO 2011006841 A1 | 1/2011 |

OTHER PUBLICATIONS

IEEE P802.11sTM/D11.0, Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 10: Mesh Networking, Apr. 2011.

IEEE Std 802.3TM-2002, IEEE Standard for Information technology—Telecommunications and information exchange between systems—Local and metropolitan area networks—Specific requirements, Part 3: Carrier sen se multiple access with collision detection (CSMA/CD) access method and physical layer specifications, Mar. 2002; 2002.

* cited by examiner

METHODS AND DEVICES FOR HANDLING
AN EXTENDED PROXY INFORMATION
ITEM

REFERENCE TO RELATED APPLICATIONS

This is a U.S. national stage of application No. PCT/EP2012/058809 filed 11 May 2012. Priority is claimed on European Application No. 11003947.6 filed 12 May 2011, the content of which is incorporated herein by reference in its entirety.

BACKGROUND OF THE INVENTION

1. Field of the Invention

The invention relates to methods and devices for handling an extended proxy information item where the devices are based on nodes and or proxy mesh gates of a wireless mesh network.

2. Description of the Related Art

In recent years, an Institute of Electrical and Electronics Engineers Standard 802.11s was developed that defines a usage of a mesh network topology with nodes/mesh stations in the mesh network serving as a relay for the propagation of messages. In order to connect such a mesh network to an external station located outside the mesh network proxy, mesh gates are implemented at the border of the mesh network that forward messages from outside to inside the mesh network and vice versa. The mesh proxy gate may change the message content, such as address translation or protocol translation.

A draft D11.0 of the IEEE 802.11s standard defines for WLAN mesh networks (WLAN—Wireless Local Area Network) a proxy information and proxy update PXU and proxy update confirmation PXUC elements. Proxy information consists of a proxy Media Access Control (MAC) address of the proxy mesh gate and an external MAC address of the external station, together with an optional lifetime of this proxy information. By using the proxy update PXU and proxy update confirmation PXUC elements the proxy information is made available to other nodes in the mesh network, whereby the other nodes are informed about which external addresses can be reached through which (proxy) mesh gate.

The proxy mesh gate G1 that proxies an external MAC address E1 can send a corresponding proxy update element. However, some other mesh station M1 in the wireless mesh network might also send this proxy information about the external MAC address of the external station and the proxy MAC address of the proxy mesh gate G1 (see FIG. 1). Dashed lines show a communication connection, such as WLAN mesh links.

However, a mesh station M1 might not have received a proxy update element from the mesh proxy gate G1 that changed the proxy information about the mesh proxy gate G1 and external MAC address E1 (for instance, the deletion of the proxy information). As a result, the mesh station might send a proxy update element with outdated proxy information on the mesh proxy gate G1 and external MAC address E1. A recipient of both proxy update elements cannot recognize the wrong chronological order and will reestablish the proxy information, which is not correct.

In the current draft, a specification of the proxy update element defines a field called PXU Sequence Number (8 bit long). However, this field is used only as a proxy update identifier, which identifies the received proxy update element in a proxy information confirmation (PXUC) element that is sent to acknowledge receipt of the proxy update element.

The messages of the path selection protocol Hybrid Wireless Mesh protocol (HWMP) of IEEE 802.11s can also contain proxy information. It always contains a HWMP sequence number, but this sequence number is only used as sequence number for the forwarding information, not for the proxy information.

US 2010/013 discloses a method for transmitting a beacon containing routing information in a mesh sensor network, where the routing information includes a sequence number that is ignored by a receiving sensor node in cases in which the sequence number corresponds to a previous sequence number.

SUMMARY OF THE INVENTION

It is therefore an object of the invention to provide methods and devices that prevent the incorrect setting of proxy information in a mesh network.

This and other objects and advantages are achieved in accordance with the invention by providing a method for generating an extended proxy information item in a mesh network, where the mesh network includes nodes formed as a proxy mesh gate and a mesh station or includes nodes formed as a proxy mesh gate, for signaling an external MAC address of an external station located outside the mesh network via a proxy MAC address of the proxy mesh gate (G1), and for a specific MAC address pair defined by the proxy address and by the external MAC address. The method comprises detecting a change in a connection of the external station with the proxy mesh gate, and generating, if the change is detected, a proxy information sequence number either (i) by incrementing an existing proxy information sequence number for the specific MAC address pair by at least one, or (ii) by using a sequence number of a message or an element coded by the standard Hybrid Wireless Mesh Protocol, where this sequence number is higher than a sequence number of a previously generated message or element coded by the standard Hybrid Wireless Mesh Protocol. The method additionally comprises generating the extended proxy information item by a first field (F1) indicating an addition or deletion of the connection, a presence of a third field (F3) and a presence of a fifth field (F5), a second field (F2) covering the external MAC address (EMACA), a third field (F3) covering the proxy MAC address (PMACA), where the presence of the third field (F3) is indicated by the first field (F1), a fourth field (F4) covering the proxy information sequence number (PISN), and a fifth field (F5) covering a proxy information lifetime (PILIFE), where the presence of the fifth field (F5) is indicated by the first field (F1).

In the context of this description, a term proxy information, as known from the standard IEEE 802.11s, is called proxy information item. Furthermore, an extended proxy information is called extended proxy information item. The term MAC is used in the description as an abbreviation of Media Access Control, as specified, e.g., by IEEE 802.3-2002 section 4.1.4 (IEEE—Institute of Electrical and Electronics Engineers) e.g. to be used in Ethernet protocol as MAC address.

It is an advantage of this method that misinterpretation of messages covering the outdated proxy information item can be avoided. This means that the reliability of proxy information item available at nodes in the mesh network can be enhanced because the forwarding of frames to a wrong proxy mesh gate due to outdated proxy information item is prevented.

The proxy information sequence number is incremented for a generation of PXU elements (PXU—proxy update) with proxy information, e.g., for the IEEE 802.11s standard, especially if a lifetime of the proxy information item is included. Another case that leads to an increment of the proxy information sequence number relates to PXUs that related to proxy information to be deleted by the respective nodes of the mesh network. In the case the proxy information sequence number is determined for a specific MAC address pair for the first time, the proxy information sequence number can be set to a pre-defined or arbitrary number.

When using a dedicated fourth field in the enhanced proxy information item the proxy information sequence number is generated by incrementing an existing proxy information sequence number. In the case that the sequence number of the element of message of the standard Hybrid Wireless Mesh Protocol (HWMP) is used no dedicated fourth field is generated in the extended proxy information item but the sequence number is used as the proxy information sequence number. Also, in this case, when a new element or message coded by HWMP is sent, the sequence number of the new element or message is incremented compared with a sequence number of a previously sent HWMP element or message. This means that the extended proxy information item can be distinguished from previously generated extended proxy information items due to the higher proxy information sequence number.

An alternative embodiment comprises a method for receiving and executing information of an extended proxy information item in a mesh network, where the mesh network includes nodes formed as a proxy mesh gate and a mesh station or includes nodes formed as a proxy mesh gate, for signaling an external MAC address of an external station located outside the mesh network via a proxy MAC address of the proxy mesh gate (G1), and for a specific MAC address pair defined by the proxy address and by the external MAC address. The method comprises receiving the extended proxy information item, and executing an addition or deletion of a connection of the external station with the proxy mesh gate, indicated by the extended proxy information item, by the node, if a proxy information sequence number of the extended proxy information item is larger than an existing proxy information sequence number of the specific MAC address pair.

It is an advantage of this method that misinterpretation of messages covering outdated proxy information item can be avoided. This means that the reliability of the proxy information item available to nodes in the mesh network can be enhanced because the forwarding of frames to wrong proxy mesh gates due to outdated proxy information is prevented. As explained previously, the proxy information sequence number is extracted either from the fourth field of the proxy information item or from the sequence number of the message or element coded by the HWMP standard. A proxy information sequence number that was received by a previous element or previous message coded by HWMP or as a fourth field of a previous proxy information element is set and used as the existing proxy information sequence number.

In an optional embodiment of the described methods, it is beneficial to transmit or receive the extended proxy information item as part of an element or message coded by a standard Hybrid Wireless Mesh Protocol. By using the standard Hybrid Wireless Mesh Protocol, a cost and resource-effective implementation and execution of the invention can be provided.

It is also an object of the invention to provide a proxy mesh gate for generating an extended proxy information item in a mesh network (MNET), where the mesh network includes nodes formed as a proxy mesh gate and a mesh station or includes nodes formed as a proxy mesh gate, for signaling an external MAC address of an external station located outside the mesh network via a proxy MAC address of the proxy mesh gate, for a specific MAC address pair defined by the proxy address and by the external MAC address. The method comprises a first unit for detecting a change in a connection of the external station with the proxy mesh gate; a second unit for generating, if the change is detected, a proxy information sequence number either (i) by incrementing an existing proxy information sequence number for the specific MAC address pair or (ii) by using a sequence number of a message or an element coded by the standard Hybrid Wireless Mesh Protocol, where this sequence number is higher than a sequence number of a previously generated message or element coded by the standard Hybrid Wireless Mesh Protocol, a third unit for generating the extended proxy information item by a first field indicating an addition or deletion of the connection, a presence of a third field and a presence of a fifth field, a second field covering the external MAC address, a third field covering the proxy MAC address, where the presence of the third field is indicated by the first field, a fourth field covering the proxy information sequence number and a fifth field covering a proxy information lifetime, where the presence of the fifth field is indicated by the first field.

It is an advantage of this proxy mesh gate that the misinterpretation of messages covering outdated proxy information can be avoided. This means that the reliability of proxy information available to nodes in the mesh network can be enhanced because the forwarding of frames to wrong proxy mesh gates due to outdated proxy information is prevented. Further advantages are described by the corresponding method.

The proxy information sequence number is incremented for a generation of PXU elements (PXU—proxy update) with proxy information item, e.g., for the IEEE 802.11s standard, especially if a lifetime of the proxy information item is included. Another case that leads to an increment of the proxy information sequence number relates to PXUs that relate to proxy information item to be deleted by the respective nodes of the mesh network. In the case the proxy information sequence number is determined for a specific MAC address pair for the first time, the proxy information sequence number can be set to a pre-defined or arbitrary number. The same applies for using the sequence number of the HWMP as the proxy information sequence number.

The proxy mesh gate can further be enhanced by a fourth unit for transmitting the extended proxy information item as part of an element or message coded by a standard Hybrid Wireless Mesh Protocol. By using the standard Hybrid Wireless Mesh Protocol, a cost and resource-effective implementation and execution of the disclosed embodiments of the invention can be provided.

It is also an object of the invention to provide a node for receiving and executing information of an extended proxy information item generated in accordance with disclosed embodiments of the method in a mesh network, where the mesh network includes nodes formed as a proxy mesh gate and a mesh station or includes nodes formed as a proxy mesh gate, for signaling an external MAC address of an external station located outside the mesh network via a proxy MAC address of the proxy mesh gate, for a specific MAC address pair defined by the proxy address and by the external MAC address. The node includes a first unit for receiving the extended proxy information item, and a second unit for executing an addition or deletion of a connection of the external station with the proxy mesh gate, indicated by the extended proxy information item, if a proxy information sequence number of the extended proxy information item is larger than an existing proxy information sequence number of the specific MAC address pair.

It is an advantage of the node that the misinterpretation of messages covering outdated proxy information can be avoided. This means that the reliability of proxy information items available to nodes in the mesh network can be enhanced because the forwarding of frames to wrong proxy mesh gates due to outdated proxy information items is prevented.

The node may further be enhanced by a third unit for receiving the extended proxy information item as part of an element coded by a standard Hybrid Wireless Mesh Protocol. By using the standard Hybrid Wireless Mesh Protocol, a cost and resource-effective implementation and execution of the disclosed embodiments of the invention can be provided.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described by the aid of the following figures, in which.

DETAILED DESCRIPTION OF THE PREFERRED EMBODIMENTS

Elements with the same functionality are labeled by identical reference signs.

In the context of this description, a term proxy information, as known from a standard IEEE 802.11s, is called proxy information item. Furthermore an extended proxy information is called extended proxy information item. The term MAC is used in the description as an abbreviation of Media Access Control, as specified, e.g., by IEEE 802.3-2002 section 4.1.4 (IEEE—Institute of Electrical and Electronics Engineers), e.g., to be used in Ethernet protocol as MAC address.

Figure 1:
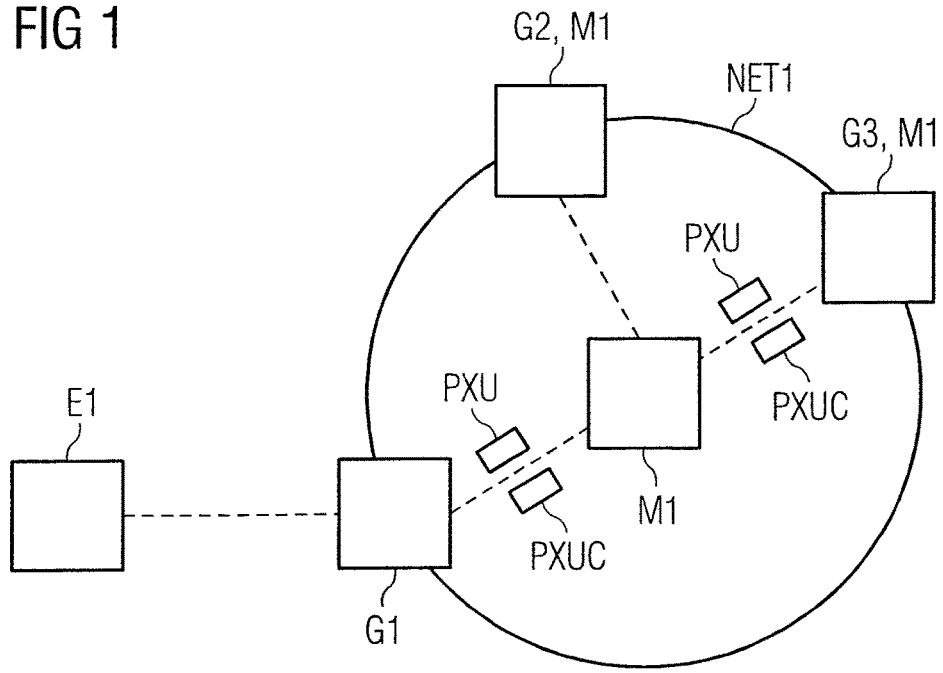
FIG. 1 shows proxy information exchanged in a mesh network in accordance with the prior art.
Figure 2:
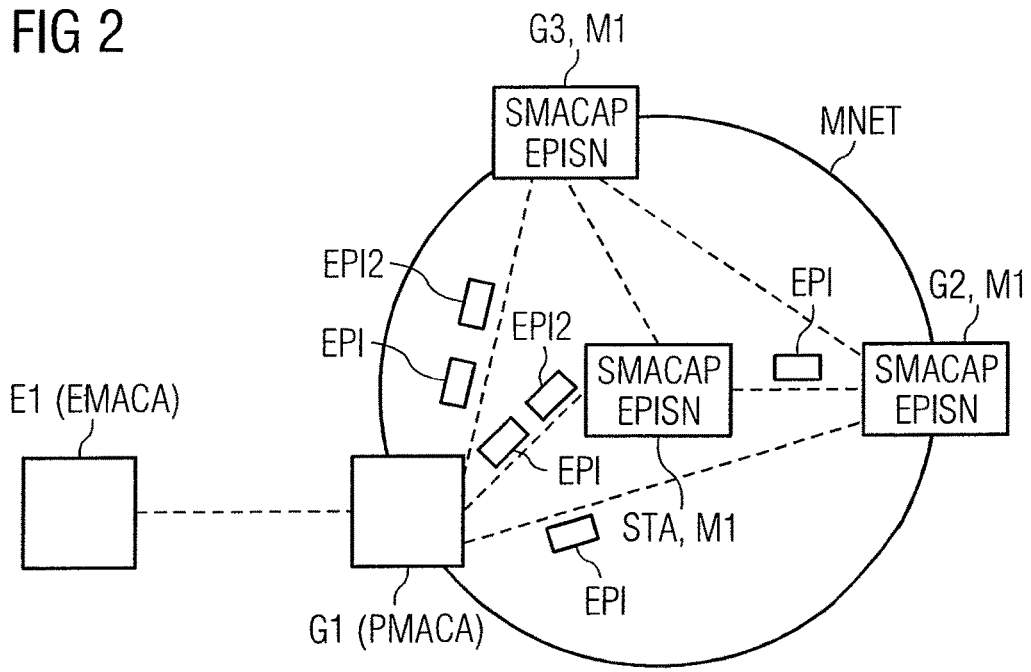
FIG. 2 shows proxy information exchanged in accordance with an exemplary embodiment of the invention.

FIG. 2 shows a first exemplary embodiment of the invention. A mesh network MNET covers three proxy mesh gates G1, G2, G3 that transmit messages from outside the mesh network to the inside and transmit messages from inside the message network to the proxy mesh gates G1, G2, G3. Furthermore, the mesh network covers a mesh station STA that may represent a laptop of a user within the mesh network. The second and third proxy mesh gate G2, G3 and the mesh station STA are also known as other mesh stations M1. In general, the proxy mesh gates and the mesh station are also known as nodes of the mesh network.

Figure 3:
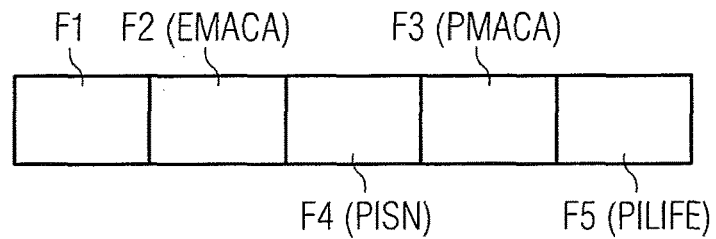
FIG. 3 show the setup of an extended proxy information element.

At a point in time, the first proxy mesh gate G1 recognizes an external station E1 that can be used to send messages to or from. In order to allow the other mesh stations M1 to send messages to the external station E1 the first proxy mesh gate G1 informs at least one of the other mesh stations M1 about the external station. Hence, the first proxy gate G1 forms an extended proxy information item EPI based on the following fields F1, ... , F5, (see also FIG. 3):

| Field | Description |
|---|---|
| F1 | Flags, see description below; |
| F2 | External MAC (media access control) address EMACA of the external station E1, e.g., a 48 bit MAC address; |
| F3 | Proxy MAC address PMACA of the first proxy gate G1, e.g., a 48-bit MAC address; |
| F4 | Proxy information sequence number PISN, e.g. an unsigned integer value; |
| F5 | Proxy information lifetime, e.g., unsigned integer value; it is set to the time for which the other mesh station STA, M1 receiving the extended proxy information item considers this proxy information to be valid; the proxy information lifetime is measured in TUs (TU—Time Units); |

The field F1 defines specific flags indicating specific functionalities of the extended proxy information item EPI:

| Bit Position | Description |
|---|---|
| 0 | It is set to 1 if the proxy information is to be deleted, and set to 0 otherwise. This bit is also known as "Delete subfield". |
| 1 | This so called "Originator Is Proxy" subfield indicates that the originator of the extended proxy information item EPI is the proxy mesh gate of this proxy information when set to 1. In this example a value of 1 signals the first proxy mesh gate G1. If it is set to 1 the extended proxy information item EPI does not contain field F3. If this subfield is 0, then the proxy MAC address is present. |
| 2 | This bit indicates whether the extended proxy information item EPI contains lifetime information of the proxy information, when set to 1. |
| 3-7 | Reserved. |

In the present example, the fields are set as follows:
F1=0000.0110 (binary form) (delete flag not set, extended proxy information item is added; the first mesh proxy gate is the originator, field F3 not used; lifetime field F5 used)
F2=0x0FFFA100AA00BA (field F2 is a 48 bit MAC address)
F3—not present
F4=376 (coded as unsigned integer)
F5=5000

When the proxy information sequence number PISN is set for the first time any arbitrary number can be used, e.g. 376.

The extended proxy information item EPI is then sent to the mesh station STA and the second proxy mesh gate G2. These other mesh stations perform the following steps:
- if it does not have proxy information for the proxy mesh gate-external MAC address pair that is called specific MAC address pair SMACAP, it creates this proxy information and sets the proxy mesh gate, the external MAC address, the proxy information sequence number, and the proxy information lifetime to the values as received in the extended proxy information item EPI with this proxy information
- if it does have proxy information for the specific set, it updates this proxy information only if the proxy information sequence number of the received proxy information is larger than the proxy information sequence number of the stored proxy information. The stored proxy information is also known as existing proxy information EPISN.

Now the respective other mesh station knows that the external station can be reached under a certain external MAC address and via the first proxy mesh gate G1.

Next, a second extended proxy information item EPI2 is generated by the first proxy mesh gate, because the external station is no longer present, e.g., it was a mobile device that moved away from the mesh network. The second extended proxy information item EPI2 is generated as follows:
F1=0000.0011 (binary form) (delete flag set; the first mesh proxy gate is the originator, field F3 not used; no lifetime information flag set, field F5 not used)
F2=0x0FFFA100AA00BA (field F2 is a 48 bit MAC address)
F3—not present
F4=377 (coded as unsigned integer)
F5—not present In order to discover the latest extended proxy information the proxy information sequence number PISN is incremented e.g., by one or any arbitrary positive value compared to an existing proxy information sequence number that was used in the previous extended proxy information item. Hence, PSNI=376+1=377.

This second extended proxy information item EPI2 for the specific MAC address pair is transmitted to the second and third proxy mesh gates and the mesh station.

When the second extended proxy information item EPI2 is received by the other mesh stations and the recipient has a valid proxy information for the specific MAC address pair stored, it compares the existing proxy information sequence number with the proxy information sequence number received. If the proxy information sequence number received is higher than the existing proxy information sequence number, then it will delete the proxy information for the specific MAC address pair. Otherwise, no deletion will be performed.

If one of the other mesh stations M1 receives a proxy information element with extended proxy information item to be deleted, it may or has still to record the deleted proxy information so that it is able to compare the proxy information sequence number with other received extended proxy information items for this proxy mesh gate-external MAC address pair in order to determine whether the received proxy information is newer or older than the deletion.

This can be best achieved by extending the stored extended proxy information item with a Delete flag indicating whether the extended proxy information item is valid (added) or invalid (deleted). It is set according to the Delete flag for the extended proxy information item in the received proxy update element PXU.

Next, in time the second proxy mesh gate G2 sends the extended proxy information item EPI covering as proxy information sequence number PISN=376 to the third proxy mesh gate G3. The proxy mesh gate G3 does not update its stored proxy information for the specific MAC address pair based on the received extended proxy information item, because the received proxy information sequence number 376 is not larger than the stored (existing)=proxy information sequence number 377. Hence, the third proxy mesh gate G3 retains the correct proxy information for the specific MAC address pair and does not accept the wrong proxy information on the specific MAC address pair contained in the recent extended proxy information item from the second proxy mesh gate G2.

In another example, the proxy information is transmitted using a HWMP of a standard IEEE 802.11 (HWMP—Hybrid Wireless Mesh Protocol; IEEE—Institute of Electrical and Electronics Engineers). When, e.g., the mesh station STA receives proxy information of the extended proxy information items in a HWMP element (address extension is available), it does the following:
- if the mesh station does not have proxy information for the proxy mesh gate-external MAC address pair (the proxy mesh gate is for instance the Originator Mesh STA address or the Target Mesh STA address, the external MAC address is for instance the Originator External Address or the Target External Address), it creates this proxy information and sets the proxy mesh gate, the external MAC address, the proxy information sequence number, and the proxy information lifetime to the corresponding values as received in the HWMP element with this proxy information according to the existing rules. The proxy information sequence number is set to the HWMP sequence number from the received HWMP element.
- if it does have proxy information for the proxy mesh gate-external MAC address pair, it updates this proxy information only if the HWMP sequence number of the received HWMP element with the proxy information is larger than the proxy information sequence number of the stored proxy information.

The method steps described above may be implemented in software, whereby the software may be stored on a memory device such as a CDROM and may be executed by a processor unit. Data may be received or sent via an IO unit that is connected to the processor unit. In addition the processor unit may be connected to a memory unit for storing intermediate data and/or instruction of the software.

Figure 4:
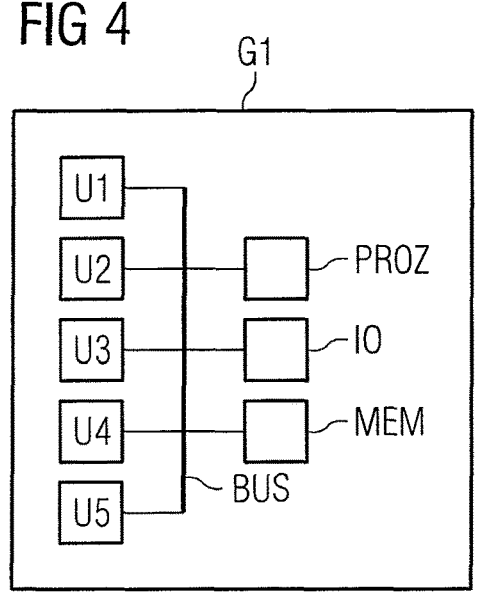
FIG. 4 shows a proxy mesh gate in accordance with the present invention.
Figure 5:
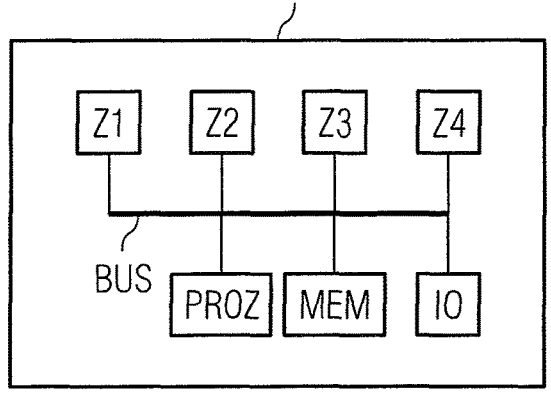
FIG. 5 shows a node in a mesh network in accordance with the present invention.

The invention further covers a proxy mesh gate for generating an extended proxy information item in the mesh network with the following units as shown in FIG. 4:
- a first unit U1 for detecting a change in a connection of the external station E1 with the proxy mesh gate G1,
- a second unit U2 for generating, if the change is detected, a proxy information sequence number PISN either (i) by incrementing an existing proxy information sequence number EPISN for the specific MAC address pair SMACAP by at least one or (ii) by using a sequence number of a message of element coded by the standard Hybrid Wireless Mesh protocol, where this sequence number is higher than a sequence number of a previously generated message or element coded by the standard Hybrid Wireless Mesh Protocol, and a third unit U3 for generating the extended proxy information item EPI by:
a first field F1 indicating an addition or deletion of the connection, a presence of a third field F3 and a presence of a fifth field F5,
a second field F2 covering the external MAC address EMACA,
a third field F3 covering the proxy MAC address PMACA, where the presence of the third field F3 is indicated by the first field F1,
a fourth field F4 covering the proxy information sequence number PISN; and
a fifth field F5 covering a proxy information lifetime PILIFE, where the presence of the fifth field F5 is indicated by the first field F1.

The proxy mesh gate may cover further a fourth unit U4 for transmitting the extended proxy information item EPI, EPI2 as part of an element coded by a standard Hybrid Wireless Mesh Protocol and/or a fifth unit U5 for setting the proxy information sequence number by a sequence number of the element coded by a standard Hybrid Wireless Mesh Protocol.

The units U1, . . . , U5 may be connected via a bus BUS to exchange data among each other and/or with a processor PROZ and memory unit MEM. Furthermore, the units, the processor and the memory may receive or transmit data via an IO module IO.

The other mesh station or node G2, G3, M1 for receiving and executing information of an extended proxy information item EPI, EPI2 in a mesh network MNET may contain the following units:
a first unit Z1 for receiving the extended proxy information item EPI;
a second unit Z2 for executing an addition or deletion of a connection of the external station E1 with the proxy mesh gate G1, indicated by the extended proxy information item EPI, by the node G2, G3, M1 only, if a proxy information sequence number PISN of the extended proxy information item EPI, EPI2 is larger than an existing proxy information sequence number EPISN of the specific MAC address pair SMACAP.

In addition, the mesh station or node may cover a third unit Z3 for transmitting the extended proxy information item EPI, EPI2 as part of an element coded by a standard Hybrid Wireless Mesh Protocol. Furthermore, the mesh station or node may contain a fourth unit Z4 for executing additional functions of the respective node as described before.

The units Z1, . . . , Z4 may be connected via a bus BUS to exchange data among each other and/or with a processor PROZ and memory unit MEM. Furthermore, the units, the processor and the memory may receive or transmit data via an IO-module IO.

Figure 6:
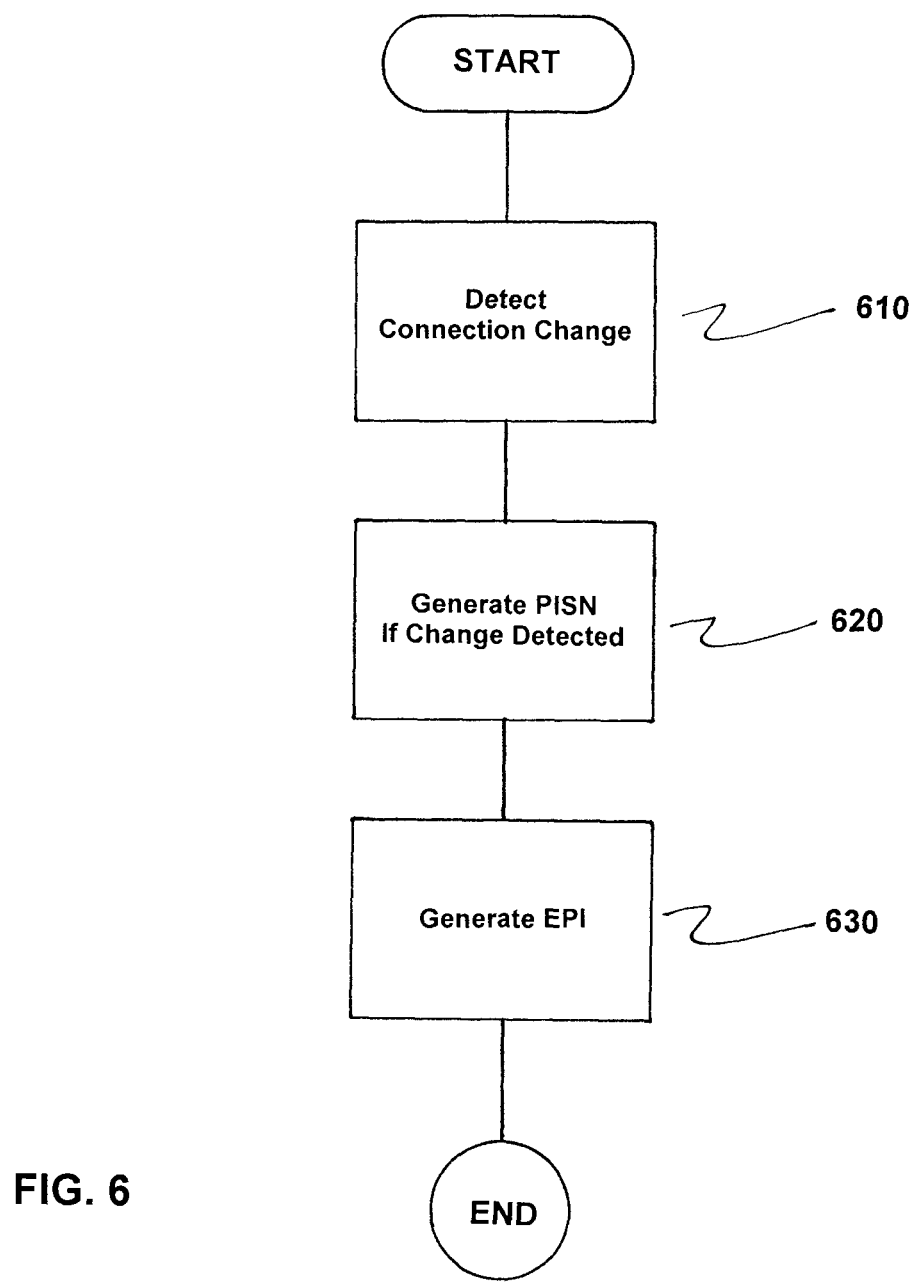
FIG. 6 is a flowchart of the method in accordance with the invention.

FIG. 6 is a flowchart of the method for generating an extended proxy information item (EPI, EPI2) in a mesh network (MNET) including nodes formed as at least one of a proxy mesh gate (G1) and a mesh station (M1), and for signaling an external MAC address (EMACA) of an external station (E1) located outside the mesh network (MNET) via a proxy media access control (MAC) address (PMACA) of the proxy mesh gate (G1), for a specific MAC address pair (SMACAP) defined by the proxy address (PMACA) and by the external MAC address (EMACA). The method comprises detecting a change in a connection of the external station (E1) with the proxy mesh gate (G1), as indicated in step 610.

Next, if the change is detected, then a proxy information sequence number (PISN) is generated by either (i) incrementing an existing proxy information sequence number (EPISN) for the specific MAC address pair (SMACAP) by at least one or (ii) using a sequence number of a message or an element coded in accordance with a standard Hybrid Wireless Mesh Protocol, as indicated in step 620. Here, the sequence number is higher than a sequence number of a previously generated message or element coded by the standard Hybrid Wireless Mesh Protocol.

Next, the extended proxy information item (EPI) is then generated as indicted in step 630 by a first field (F1) indicating an addition or deletion of the connection, a presence of a third field (F3) and a presence of a fifth field (F5), a second field (F2) covering the external MAC address (EMACA), a third field (F3) covering the proxy MAC address (PMACA), where the presence of the third field (F3) is indicated by the first field (F1), a fourth field (F4) covering the proxy information sequence number (PISN), and a fifth field (F5) covering a proxy information lifetime (PILIFE), a presence of the fifth field (F5) being indicated by the first field (F1).

Figure 7:
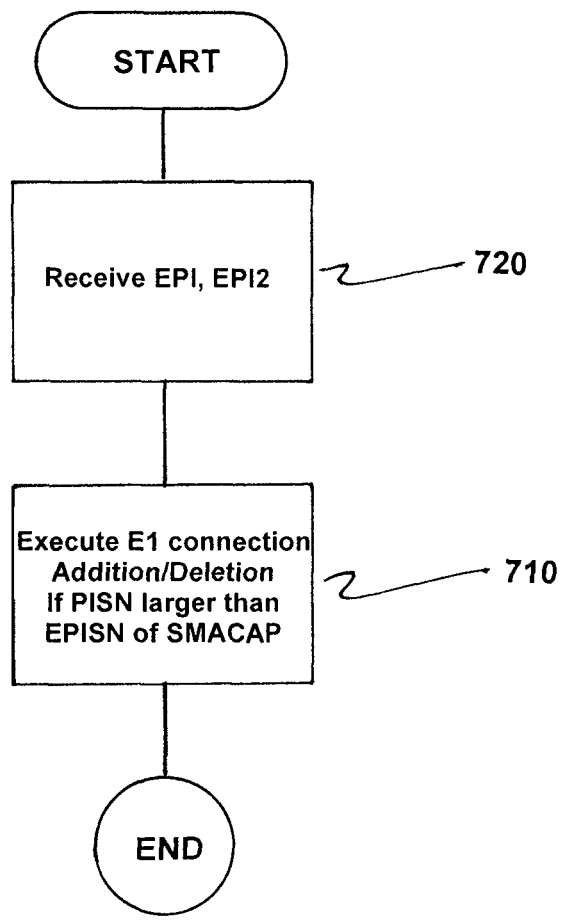
FIG. 7 is a flowchart of the method in accordance with an embodiment of the invention.

FIG. 7 is a flowchart of an alternative method for receiving and executing information of an extended proxy information item (EPI, EPI2) in a mesh network (MNET) including nodes formed as at least one of a proxy mesh gate (G1) and a mesh station (M1), for signaling an external MAC address (EMACA) of an external station (E1) located outside the mesh network (MNET) via a proxy MAC address (PMACA) of the proxy mesh gate (G1), for a specific MAC address pair (SMACAP) defined by the proxy address (PMACA) and by the external MAC address (EMACA). The method comprises receiving the extended proxy information item (EPI, EPI2), as indicated in step 710.

Next, executing an addition or deletion of a connection of the external station (E1) with the proxy mesh gate (G1), indicated by the extended proxy information item (EPI, EPI2), is executed by the node (G2, G3, M1), if a proxy information sequence number (PISN) of the extended proxy information item (EPI, EPI2) is larger than an existing proxy information sequence number (EPISN) of the specific MAC address pair (SMACAP), indicated in step 720.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A method for generating an extended proxy information item in a mesh network including one of (i) nodes formed as a proxy mesh gate and a mesh station and (ii) nodes formed as the proxy mesh gate, and for signaling an external MAC address of an external station located outside the mesh network via a proxy media access control address of the proxy mesh gate, for a specific address pair defined by the proxy address and by the external MAC address to enhance reliability of proxy information items available at nodes in the mesh network by preventing forwarding of frames to a wrong proxy mesh gate due to outdated proxy information, the method comprising:

detecting a change in a connection of the external station with the proxy mesh gate;

generating, if the change is detected, a proxy information sequence number by one of incrementing an existing proxy information sequence number for the specific MAC address pair by at least one and using a sequence number of a message or an element coded in accordance with a standard Hybrid Wireless Mesh Protocol, the sequence number being higher than a sequence number of a previously generated message or element coded by the standard Hybrid Wireless Mesh Protocol;

generating the extended proxy information item to enhance the reliability of the proxy information items available at the nodes in the mesh network such that the forwarding of the frames to the wrong proxy mesh gate due to the outdated proxy information is prevented by:
a first field indicating an addition or deletion of the connection, a presence of a third field and a presence of a fifth field,
a second field covering the external MAC address,
a third field covering the proxy MAC address, the presence of the third field being indicated by the first field,
a fourth field covering the proxy information sequence number, and
a fifth field covering a proxy information lifetime, a presence of the fifth field being indicated by the first field.

2. A method for receiving and executing information of an extended proxy information item generated in a mesh network including one of (i) nodes formed as a proxy mesh gate and a mesh station and (ii) nodes formed as the proxy mesh gate, for signaling an external MAC address of an external station located outside the mesh network via a proxy MAC address of the proxy mesh gate, for a specific MAC address pair defined by the proxy address and by the external MAC address to enhance reliability of proxy information items available at nodes in the mesh network by preventing forwarding of frames to a wrong proxy mesh gate due to outdated proxy information, the method comprising:

receiving the extended proxy information item; and executing an addition or deletion of a connection of the external station with the proxy mesh gate, indicated by the extended proxy information item, by the node, if a proxy information sequence number of the extended proxy information item is larger than an existing proxy information sequence number of the specific MAC address pair to enhance reliability of the proxy information items available at the nodes in the mesh network by preventing the forwarding of the frames to the wrong proxy mesh gate due to the outdated proxy information.

3. The method according to claim 1, further comprising: receiving the extended proxy information item as part of a message of an element coded by a standard Hybrid Wireless Mesh Protocol.

4. The method according to claim 2, further comprising: receiving the extended proxy information item as part of a message or an element coded by a standard Hybrid Wireless Mesh Protocol.

5. A proxy mesh gate for generating an extended proxy information item in a mesh network including one of (i) nodes formed as the proxy mesh gate and a mesh station and (ii) nodes formed as the proxy mesh gate, for signaling an external MAC address of an external station located outside the mesh network via a proxy MAC address of the proxy mesh gate, for a specific MAC address pair defined by the proxy address and by the external MAC address to enhance reliability of proxy information items available at nodes in the mesh network by preventing forwarding of frames to a wrong proxy mesh gate due to outdated proxy information, the proxy mesh gate comprising:

a processor;
memory;
a first device for detecting a change in a connection of the external station with the proxy mesh gate;
a second device for generating, if the change is detected, a proxy information sequence number by one of (i) incrementing an existing proxy information sequence number for the specific MAC address pair by at least one and (ii) using a sequence number of a message or an element coded by a standard Hybrid Wireless Mesh Protocol, the sequence number being higher than a sequence number of a previously generated message or element coded by the standard Hybrid Wireless Mesh Protocol;
a third device for generating the extended proxy information item to enhance reliability of the proxy information items available at the nodes in the mesh network such that the forwarding of the frames to the wrong proxy mesh gate due to the outdated proxy information is prevented by:
a first field indicating an addition or deletion of the connection, a presence of a third field and a presence of a fifth field,
a second field covering the external MAC address,
a third field covering the proxy MAC address, the presence of the third field being indicated by the first field,
a fourth field covering the proxy information sequence number, and
a fifth field covering a proxy information lifetime, a presence of the fifth field being indicated by the first field.

6. The proxy mesh gate according to claim 5, further comprising:
a fourth device for transmitting the extended proxy information item as part of a message or an element coded by a standard Hybrid Wireless Mesh Protocol.

7. A node for receiving and executing information of an extended proxy information item in a mesh network including one of (i) nodes formed as a proxy mesh gate and a mesh station and (ii) nodes formed as the proxy mesh gate, for signaling an external MAC address of an external station located outside the mesh network via a proxy MAC address of the proxy mesh gate, for a specific MAC address pair defined by the proxy address and by the external MAC address to enhance reliability of proxy information items available at nodes in the mesh network by preventing forwarding of frames to a wrong proxy mesh gate due to outdated proxy information, the node comprising:

a processor;
memory;
a first device for receiving the extended proxy information item; and
a second device for executing an addition or deletion of a connection of the external station with the proxy mesh gate, indicated by the extended proxy information item, if a proxy information sequence number of the extended proxy information item is larger than an existing proxy information sequence number of the specific MAC address pair to enhance reliability of the proxy information items available at the nodes in the mesh network by preventing the forwarding of the frames to the wrong proxy mesh gate due to the outdated proxy information.

8. The node according to claim 7, further comprising:
a third device for receiving the extended proxy information item as part of an element or message coded by a standard Hybrid Wireless Mesh Protocol.

\* \* \* \* \*